3,591,667
METHOD OF PRODUCING A CELLULOSE HEMODIALYSIS MEMBRANE

Virendra Kumar Kulshrestha, Salt Lake City, Utah, assignor to University of Utah
No Drawing. Filed Mar. 16, 1970, Ser. No. 20,029
Int. Cl. C08b 1/00, 29/24
U.S. Cl. 264—218      7 Claims

ABSTRACT OF THE DISCLOSURE

The invention disclosed herein relates to a novel method for producing a regenerated cellulose hemodialysis membrane. The cellulose is dissolved in a cupriethylenediamine hydroxide solution and then cast into a film and suitably treated to produce a hemodialysis membrane of improved permeability and ultrafiltration. Cuenophane is the name chosen by the inventor to be applied to this regenerated cellulose membrane.

---

The first clinically successful hemodialyser or artificial kidney was used in 1943 using cellophane membranes to purify the blood. Cellophane membranes are the backbone of the artificial kidney; however, presently available membranes are generally not made specifically for this purpose but are "sausage" casings made from regenerated cellulose designed for the packaging industry. Prior art methods of cellulose regeneration generally cause severe degradation in the molecular weight of the cellulose in the membrane thus reducing its effectiveness for hemodialysis.

It would therefore be a significant contribution to the art of semipermeable membranes to provide a cellophane membrane with improved permeability and ultrafiltration characteristics. Such a method of producing this type of cellophane membrane is disclosed herein.

In the present invention, cellulose is dissolved in a solution of cupriethylenediamine hydroxide and cast into a thin layer or film. The resulting film is suitably coagulated with an alkaline solution, washed with water, regenerated with an acid solution, washed again with water, and softened before being dried to provide a thin, transparent film of cuenophane. It is believed that this method of regenerating cellulose causes very little degradation of the molecular weight of the cellulose and therefore provides a more open structure in the molecular matrix which permits the passage of certain body retention products such as urea, uric acid, and creatinine more freely through the membrane.

It is therefore an object of this invention to provide a hemodialysis membrane comprised of regenerated cellulose.

Another object of this invention is to provide a means for producing a cellulose membrane from cellulose dissolved in a solution of cupriethylenediamine hydroxide.

These and other objects of this invention will become obvious when viewed in conjunction with the following description.

In the presently preferred embodiment of this invention, cellulose (commercially available as Hercules, Inc., PS33) is reduced to a finely divided state of about 40 mesh and dissolved in a solution of cupriethylenediamine hydroxide according to a ratio of about 10 grams cellulose to 250 milliliters of cupriethylenediamine hydroxide solution. The molar ratio of ethylenediamine to copper in the solution is on the order of about 2.

The cupriethylenediamine hydroxide solution is prepared from freshly distilled ethylenediamine and freshly prepared copper hydroxide $Cu(OH)_2$. The freshly prepared copper hydroxide is prepared from copper sulfate since copper hydroxide readily degrades into copper oxide (CuO).

One preferred method of preparing the cupriethylenediamine hydroxide solution comprises adding 250 grams of $CuSO_4 \cdot 5H_2O$ to a 3 liter beaker. Two liters of distilled water are added to the beaker and the contents are stirred while being heated to boiling. After the contents are cooled to room temperature approximately 110 milliliters of concentrated ammonia of specific gravity 0.90 and at about 80–90° C. is added until the precipitation of basic copper sulfate is complete. The precipitate is bluish green and the supernatant liquid is blue. Any excess ammonia, as indicated by a deep blue color, should be carefully neutralized with sulfuric acid. The precipitate is thoroughly washed with hot and cold distilled water by decantation until free of sulfate ions. One and one-half liters of distilled water are added to the precipitate and 850 milliliters NaOH are slowly added with constant agitation while maintaining the temperature below 10° C. to prevent the formation of black cupric oxide. The precipitate is washed with aliquots of distilled water until the wash water is free of NaOH as shown by a phenolthalein indicator. The washed precipitate is covered with one-half liter of distilled water and blanketed with an inert atmosphere such as nitrogen.

Freshly distilled 70% ethylenediamine is added to the precipitate while taking care that no oxygen enters the container. While maintaining the nitrogen atmosphere over the solution, the container is placed on a rotary shaker for about 12–16 hours and then removed and allowed to stand for about 8 hours to settle the excess $Cu(OH)_2$ sludge. If desired, the supernatant liquid may be filtered to assure a clear liquid. After analyzation and adjustment to achieve an ethylenediamine to copper ratio of 2 the solution is blanketed with an inert gas and stored in the dark wherein it will remain stable for approximately one month.

In the presently preferred embodiment about 10 grams of cellulose ground to about 40 mesh is placed in a bottle with about 250 milliliters of cupriethylenediamine hydroxide solution and about one gram of copper foil pieces which have been thoroughly cleaned of all contaminants. The copper foil acts as an inhibitor to the oxidation of the cellulose. After blanketing with an inert atmosphere, the container is agitated for about 12–16 hours or until all the cellulose has been dissolved. Complete dissolution of the cellulose is an important factor in producing strong, transparent membranes.

After being suitably cast into a film of desired thickness, the cellulose film is coagulated by contacting it with a solution comprising about 10% NaOH. An immersion of about 15 minutes completely coagulates the film as indicated by its whitish blue appearance. The coagulated film can be easily moved over the casting surface.

The film is washed to remove all traces of NaOH and then regenerated in an 8% $H_2SO_4$ bath for about 10 minutes. Repeated washing with hot water (about 50° C.) removes the acid from the film before it is softened by soaking in a 20% glycerol solution for about five minutes.

Drying is accomplished in a dryer at about 80° C. until the film thickness becomes constant.

It should be noted that a shrinkage of about 25% occurs during coagulation, regeneration, and drying.

It has been found that the solubility of cellulose decreases if the ethylenediamine hydroxide/copper ratio is greater than 2:1. The optimal ratio is 2:1 and a ratio less than that causes the solvent to be a better solvent but less stable.

Light and oxygen should be excluded during the making of the cupriethylenediamine hydroxide solution and the dissolution of copper to prevent formation of undesirable products.

It is presumed that cellulose dissolves in cupriethylenediamine hydroxide by forming a complex therewith. Hydrogen groups are first protolysed, and only then can complex formation take place. The copper is probably bound by the adjacent ionized hydroxal groups in a chelate structure. It is obvious that the distribution of the copper atoms and its ligands along a cellulose molecule will be satisfactorily governed by the complexity content of the respective components.

We claim:

1. In a method of producing a cellulose hemodialysis membrane of improved permeability and ultrafiltration comprising the steps of:
    (a) dissolving cellulose in a solvent therefor;
    (b) casting said dissolved cellulose into a film;
    (c) coagulating said cellulose film in an alkaline solution;
    (d) washing said cellulose film to cleanse said film of said alkaline solution;
    (e) regenerating said cellulose film by contacting it with an acid solution;
    (f) washing said cellulose film to cleanse said film of said acid solution;
    (g) treating said cellulose film with a softening agent; and
    (h) drying said cellulose film, the improvement which comprises employing a solution of cupriethylenediamine hydroxide as the solvent of said step (a).

2. A method of producing a hemodialysis membrane of improved permeability as defined in claim 1 wherein said cellulose is reduced to a finely divided state on the order of about 40 mesh.

3. A method of producing a hemodialysis membrane of improved permeability as defined in claim 1 wherein said cupriethylenediamine hydroxide solution comprises a molar ratio of ethylenediamine to copper of about 2:1.

4. A method of producing a hemodialysis membrane of improved permeability as defined in claim 1 wherein said coagulation occurs during an immersion in an alkaline solution comprised of NaOH.

5. A method of producing a hemodialysis membrane of improved permeability as defined in claim 1 wherein said regeneration is accomplished by immersing said cellulose film in an acid solution comprised of $H_2SO_4$.

6. A method of producing a hemodialysis membrane of improved permeability as defined in claim 1 wherein said treatment comprises soaking said cellulose film in a softening agent comprised of glycerol.

7. A method of producing a hemodialysis membrane of improved permeability as defined in claim 1 wherein said drying is accomplished at about 80° C.

References Cited

UNITED STATES PATENTS

| | | | |
|---|---|---|---|
| 2,025,000 | 12/1935 | Losee | 106—167 |
| 3,000,763 | 9/1961 | Anderson et al. | 106—168 |
| 3,093,446 | 6/1963 | Allewelt | 106—167 |

OTHER REFERENCES

Journal of Polymer Science, vol. XV, pp. 343–354 (1955), article by Loeb et al.

DONALD E. CZAJA, Primary Examiner

R. W. GRIFFIN, Assistant Examiner

U.S. Cl. X.R.

106—167, 168; 210—22, 321; 260—212

UNITED STATES PATENT OFFICE
CERTIFICATE OF CORRECTION

Patent No. 3,591,667          Dated July 6, 1971

Inventor(s) VIRENDRA KUMAR KULSHRESTHA

It is certified that error appears in the above-identified patent and that said Letters Patent are hereby corrected as shown below:

Column 1, after the Title "METHOD OF PRODUCING A CELLULOSE HEMODIALYSIS MEMBRANE" insert -- This invention was made in the course of research supported by a contract from the Department of Health, Education and Welfare; and the assignee of this patent hereby grants and conveys to the United States Government a royalty-free, non-exclusive and irrevocable license for governmental purposes for the term of the patent. --

Signed and sealed this 8th day of May 1973.

(SEAL)
Attest:

EDWARD M. FLETCHER, JR.          ROBERT GOTTSCHALK
Attesting Officer                Commissioner of Patents